(12) United States Patent
Toyota

(10) Patent No.: US 6,354,108 B1
(45) Date of Patent: Mar. 12, 2002

(54) METHOD FOR PREVENTING CONSOLIDATION OF BLAST FURNANCE GRANULATED SLAG AND CONSOLIDATION PREVENTING SYSTEM

(76) Inventor: Junzo Toyota, 4-2-701, Yuuhigaokacho, Tennouji-ku, Osaka shi, 433-0075 (JP)

(*) Notice: Subject to any disclaimer, the term of this patent is extended or adjusted under 35 U.S.C. 154(b) by 0 days.

(21) Appl. No.: 09/202,544
(22) PCT Filed: Apr. 10, 1998
(86) PCT No.: PCT/JP98/01675
§ 371 Date: Dec. 23, 1999
§ 102(e) Date: Dec. 23, 1999
(87) PCT Pub. No.: WO99/52835
PCT Pub. Date: Oct. 21, 1999

(51) Int. Cl.[7] .............................. C04B 5/02; C04B 5/06
(52) U.S. Cl. ............................. 65/19; 65/21.1; 65/141; 65/142; 588/251
(58) Field of Search .................... 65/19, 21.1, 141, 65/142; 588/251; 75/434, 547; 106/714, 679, 745, 767, 789

(56) References Cited

U.S. PATENT DOCUMENTS

| | | | |
|---|---|---|---|
| 747,919 A | * | 12/1903 | Passow |
| 1,113,933 A | * | 10/1914 | Duncan |
| 2,816,043 A | * | 12/1957 | Van Heiningen et al. |
| 2,819,172 A | * | 1/1958 | Trief |
| 4,204,855 A | * | 5/1980 | Monteyne |
| 4,230,477 A | * | 10/1980 | Sharonov et al. |
| 4,268,295 A | * | 5/1981 | Yamamoto et al. |
| 5,569,314 A | * | 10/1996 | Mikhail et al. |

FOREIGN PATENT DOCUMENTS

| | | |
|---|---|---|
| JP | 5453138 | 4/1979 |
| JP | 54-53138 | * 4/1979 |
| JP | 54127895 | 10/1979 |
| JP | 59-116156 | 12/1982 |

OTHER PUBLICATIONS

Journal of the Iron and Steel Institute of Japan, vol. 64, No. 4, Mar. 1978.
Translation of JP 54–53138.*

* cited by examiner

Primary Examiner—Michael Colaianni
(74) Attorney, Agent, or Firm—Price and Gess

(57) ABSTRACT

The object of the present invention is to provide a safe, easy-to-manage, successive, and swift method and system for preventing granulated blast-furnace slag from solidifying. Carbonated water is generated by dissolving carbon dioxide in water. Granulated blast-furnace slag which has been cooled is immersed in the generated carbonated water.

14 Claims, 2 Drawing Sheets

METHOD FOR PREVENTING CONSOLIDATION OF BLAST FURNANCE GRANULATED SLAG AND CONSOLIDATION PREVENTING SYSTEM

FIELD OF THE INVENTION

The present invention relates to processing of granulated blast-furnace slag, and in particular to a method and a system for preventing granulated blast-furnace slag from solidifying due to its latent hydraulic property.

BACKGROUND OF THE INVENTION

Granulated blast-furnace slag is a very useful material since it can be used as blast-furnace cement or as a substitute for sand used as fine aggregate for construction work.

Granulated blast-furnace slag has a glass-like three-dimensional net structure. The spaces in this structure are irregularly filled with calcium ions. Therefore, granulated blast-furnace slag including moisture solidifies over time when subjected to a simple external stimulus, such as an alkaline stimulus. This means that granulated blast-furnace slag has a latent hydraulic property.

The latent hydraulic property is a property whereby calcium ions that come into contact with water become calcium hydroxide ($Ca(OH)_2$) having a fluidity and particles of granulated blast-furnace slag combine with each other to become a big mass through the agency of this calcium hydroxide.

Once granulated blast-furnace slag solidifies, the solidified granulated blast-furnace slag becomes a very hard solid mass. Therefore, a large amount of effort is required to break the solidified granulated blast-furnace slag into pieces for use as blast-furnace cement. Also, the blast-furnace cement formed using such pieces will not solidify to a regular hardness.

It should be noted here that the granulated blast-furnace slag is formed by bringing molten slag whose temperature is extremely high, such as 1200° C. into contact with water to rapidly cool the molten slag. Therefore, molten slag is necessarily brought into contact with water to form granulated blast-furnace slag. As a result, calcium hydroxide ($Ca(OH)_2$) is inevitably produced.

Needless to say, even if calcium hydroxide ($Ca(OH)_2$) is produced, the solidification of granulated blast-furnace slag will still take a certain amount of time. However, granulated blast-furnace slag is used as a material for blast-furnace cement on a massive scale. Therefore, it is preferable that granulated blast-furnace slag stays in a stable state without solidifying for a long time.

Various methods have been proposed to prevent granulated blast-furnace slag from solidifying due to its latent hydraulic property. For instance, Japanese Laid-Open Patent Application No. 54-131504 discloses a method of preventing the solidification by maintaining the pH of cooling circulation water used for manufacturing granulated slag at 6.5 or less. Also, Japanese Laid-Open Patent Application Nos. 54-127895, 54-131504, and 54-112304 disclose methods of preventing the solidification by bringing granulated blast-furnace slag into contact with carbon dioxide gas during or after a coarsely crushing process.

In the former method, an acid is added to the blast-furnace slag to cause a neutralization reaction between the acid and the calcium ions in the slag. As a result, the solidification property is weakened. In the case of the method using carbon dioxide, the same neutralization reaction occurs. It should be noted here that in the case of the method using carbon dioxide, carbon dioxide does not directly react to calcium ions but is absorbed into the moisture existing on the surface of the granulated blast-furnace slag or in the air and a small amount of carbonated water is generated. The small amount of carbonated water reacts with the calcium ions, causing a neutralization. As a result, the increase in pH is inhibited and the granulated blast-furnace slag is prevented from solidifying.

With the conventional method where the pH of the cooling circulation water is maintained at 6.5 or less, however, an acid, such as hydrochloric acid, sulfuric acid, or phosphoric acid, needs to be managed. It is hazardous and difficult to manage strong acids, such as hydrochloric acid and sulfuric acid. Also, cooling circulation water is usually sprayed to granulate molten slag whose temperature is high (around 1200° C.). Therefore, only water evaporates and acid becomes extremely concentrated around cooling units, which may lead to corrosion of the equipment.

Furthermore, with the first conventional method, the temperature of cooling circulation water becomes extremely high, as described above. Therefore, when carbonated water is used as the cooling circulation water, the carbon dioxide in the carbonated water will be aerified. As a result, the effects of the carbonated water will not be obtained.

On the other hand, the method of preventing the solidification by bringing granulated blast-furnace slag into contact with carbon dioxide gas during or after a coarsely crushing process requires a considerable processing time, even if the moisture content of granulated blast-furnace slag is increased. Therefore, this method is inappropriate to successive processing in actual factories where hundreds or thousands of tons of granulated blast-furnace slag is manufactured. Also, it is very difficult to have carbon dioxide gas evenly permeate granulated blast-furnace slag.

With regard to the above problems, the object of the present invention is to provide a safe, easy-to-manage, successive, and swift method and system for preventing the granulated blast-furnace slag from solidifying.

DISCLOSURE OF THE INVENTION

To solve the stated problems, the solidification prevention method for granulated blast-furnace slag of the present invention includes: a first step for generating carbonated water by dissolving carbon dioxide gas in water; and a second step for immersing granulated blast-furnace slag in the generated carbonated water after the granulated blast-furnace slag has been cooled. Here, in the first step, exhaust gas from an existing blast-furnace facility may supply the carbon dioxide gas.

To solve the stated problems, the solidification prevention system for granulated blast-furnace slag of the present invention includes: a carbonated water generation unit; and a granulated blast-furnace slag processing unit. The carbonated water generation unit includes: a reaction unit for generating carbonated water by dissolving carbon dioxide gas in water; a water inflow opening for allowing the water to flow into the reaction unit; a gas inflow opening for allowing the carbon dioxide gas to flow into the reaction unit; and a carbonated water outflow opening for allowing the generated carbonated water to flow out of the reaction unit.

The granulated blast-furnace slag processing unit includes: a storage vessel for storing the generated carbonated water; a carbonated water inflow opening for allowing the generated carbonated water to flow into the storage vessel; a slag introduction unit for introducing granulated blast-furnace slag into the storage vessel; and a slag discharge unit for discharging the granulated blast-furnace slag from the storage vessel.

The solidification prevention system may further include: a first cooling unit for cooling and granulating molten slag; a second cooling unit for cooling granulated blast-furnace slag generated by the first cooling unit; and a transport unit for transporting the granulated blast-furnace slag to the slag introduction unit immediately after the granulated blast-furnace slag has been cooled by the second cooling unit.

The solidification prevention system may further include a water circulation unit for circulating water remaining in the storage vessel for use as the water for generating the carbonated water.

DESCRIPTION OF THE PREFERRED EMBODIMENT

Figure 1:
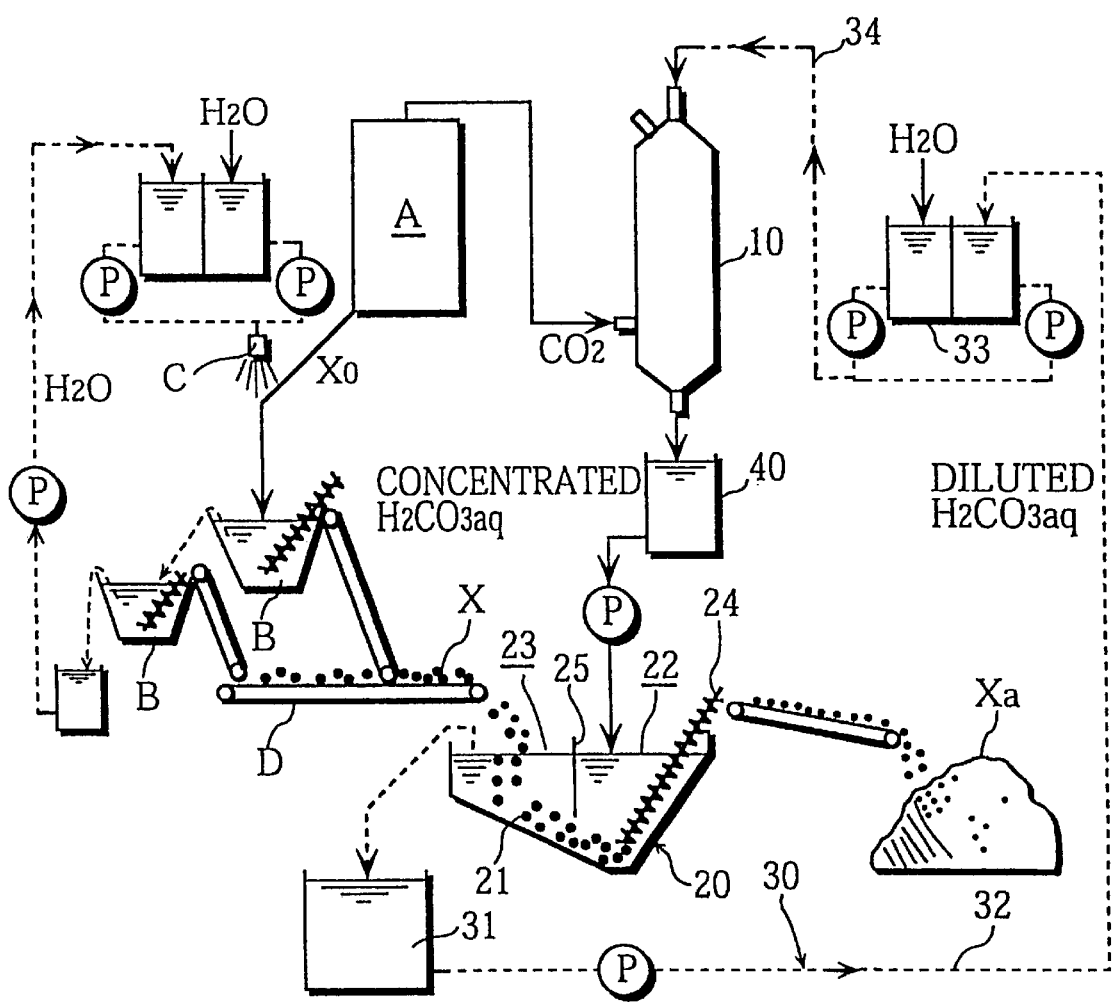
FIG. 1 shows the process of the manufacturing and processing of granulated blast-furnace slag using the system of the present invention for preventing granulated blast-furnace slag from solidifying.

The following is a description of the embodiment of the present invention, with reference to the drawings. FIG. 1 shows the process of the manufacturing and processing of granulated blast-furnace slag using the system of the present invention for preventing the granulated blast-furnace slag from solidifying.

The manufacturing process of granulated blast-furnace slag is briefly described first. In FIG. 1, granulated blast-furnace slag is produced by the blast-furnace facility A, the granulation vessel B, and the cooling water spraying unit C. The blast-furnace facility A discharges molten slag X0. The discharged molten slag is introduced into the granulation vessel B. While being introduced, the molten slag is cooled by cooling water sprayed by the cooling water spraying unit C. The molten slag is further cooled in the granulation vessel B and becomes the granulated slag X. The granulated slag X is transported to the granulated blast-furnace slag processing vessel 20 described later by the transport unit D including screw conveyors and belt conveyors. The exhaust gas from the blast-furnace facility A mainly includes carbon dioxide gas and is led into the carbonated water producing tower 10 described later.

Figure 2:
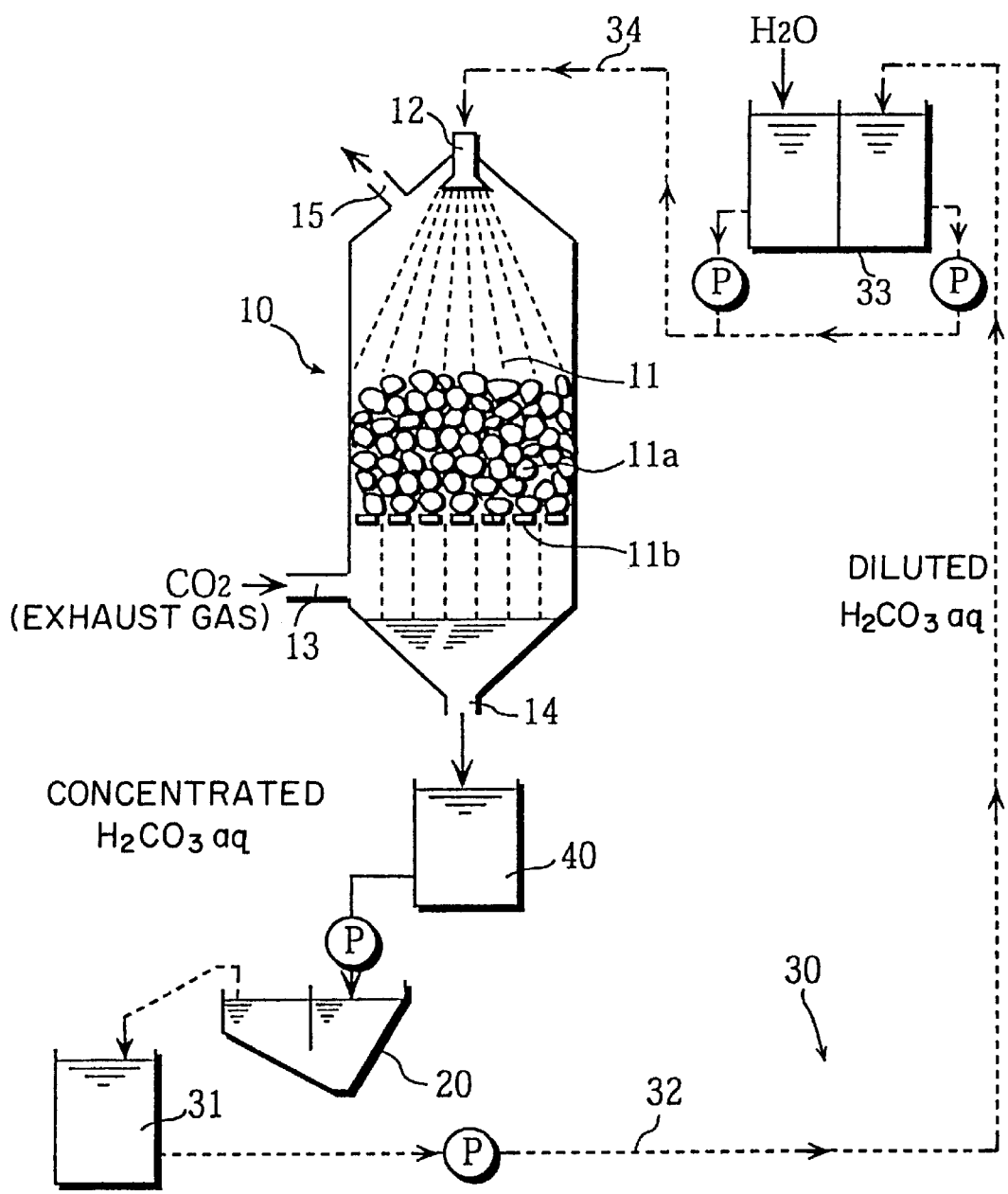
FIG. 2 shows the manufacturing process of carbonated water.

After being produced and transported in this manner, the granulated blast-furnace slag X is processed so as not to solidify by the solidification prevention system including the carbonated water producing tower 10 and the granulated blast-furnace slag processing vessel 20 shown in FIG. 1. The following description concerns this solidification prevention system. The detailed construction of the carbonated water producing tower 10 is shown in FIG. 2. FIG. 2 shows the manufacturing process of carbonated water and a longitudinal section view of the carbonated water producing tower 10. As shown in this figure, the carbonated water producing tower 10 includes the reaction unit 11, the solvent water inflow opening 12, the gas inflow opening 13, the carbonated water outflow opening 14, and the gas exhaust opening 15.

The reaction unit 11 allows the carbon dioxide gas included in the exhaust gas to dissolve in solvent water so that carbonated water is produced. The reaction unit 11 includes the reaction acceleration unit 11a, which is a pile of ballast and glass balls, and the net 11b supporting the reaction acceleration unit 11a.

The solvent water inflow opening 12 allows solvent water to flow into the reaction unit 11. This opening 12 is provided at the top of the carbonated water producing tower 10 and is constructed to spray the solvent water onto the reaction acceleration unit 11a evenly in all directions. Note that in this example, water remaining after the processing of granulated blast-furnace slag X is circulated to flow into the solvent water inflow opening 12 and is used as solvent water, as described later.

The gas inflow opening 13 is provided at a lower part of the carbonated water producing tower 10 and is connected to the gas exhaust opening of the blast-furnace facility A. With this construction, the gas inflow opening 13 introduces exhaust gas including a large amount of carbon dioxide gas into the reaction unit 11. The carbonated water outflow opening 14 is provided at the bottom of the carbonated water producing tower 10 and allows carbonated water generated in the reaction unit 11 to flow out of the reaction unit 11. The gas exhaust opening 15 is provided at an upper part of the carbonated water producing tower 10 and exhausts excess gas which is not used for the reaction in the reaction unit 11.

The granulated blast-furnace slag processing vessel 20 shown in FIG. 1 includes the storage vessel 21 for storing carbonated water, the carbonated water inflow opening 22, the slag introduction opening 23, the slag discharge unit 24, and the partition wall 25. The storage vessel 21 is upwardly open and has a capacity to store a desired amount of carbonated water generated in the carbonated water producing tower 10. The base of the storage vessel 21 is formed like a letter V.

The partition wall 25 is a plate partitioning the storage vessel 21 into two parts and is provided vertically with a space existing at the bottom of the storage vessel 21. The carbonated water inflow opening 22 allows carbonated water generated in the carbonated water producing tower 10 to flow into the storage vessel 21 via the concentrated carbonated water storage vessel 40, and is one of the two openings at the top of the storage vessel 21 partitioned by the partition wall 25. The slag introduction opening 23 introduces the granulated blast-furnace slag X transported by the transportation unit D described above into the storage vessel 21. The slag introduction opening 23 is the other partitioned opening of the storage vessel 21. The slag discharge unit 24 discharges granulated blast-furnace slag X which has been processed in the storage vessel 21. In this example, the slag discharge unit 24 includes a screw conveyor which is provided along the inclined surface of the base of the storage vessel 21 on the side of the carbonated water inflow opening 22.

The solidification prevention system is constructed so that carbonated water diluted by the processing in the granulated blast-furnace slag processing vessel 20 is circulated in the circulation system 30 and is used as solvent water in the carbonated water producing tower 10. This circulation system 30 includes: the diluted carbonated water storage vessel 31 for storing the carbonated water which has been diluted by the reaction in the granulated blast-furnace slag processing vessel 20 and flows from the side of the slag introduction opening 23; the first circulation route 32 used for transferring diluted carbonated water from the diluted carbonated water storage vessel 31 using a pump; the adjustment storage vessel 33 having a first storage vessel for storing diluted carbonated water circulated in the first circulation route 32 and a second storage vessel for storing supplement water; and the second circulation route 34 in which the diluted carbonated water and the supplement water are mixed and are supplied from the adjustment storage vessel 33 to the solvent water inflow opening 12 of the carbonated water producing tower 10.

The following is a description of the operation of the solidification prevention system for granulated blast-furnace slag having the stated construction. Exhaust gas which includes a large amount of carbon dioxide and is exhausted from the blast-furnace facility A is led into the carbonated water producing tower 10 through the gas inflow opening 13. At the same time, solvent water which has been circulated in the circulation system 30 is sprayed into the carbonated water producing tower 10 by the solvent water inflow opening 12. The sprayed solvent water permeates the reaction acceleration unit hla which is a pile of ballast and glass balls. Carbon dioxide gas is easily dissolved in water and produces carbonated water where the volume ratio of water to carbon dioxide is about 1:7.6 at 25° C. under normal pressure. Accordingly, the carbon dioxide gas introduced into the carbonated water producing tower 10 is easily dissolved in the solvent water having permeated the reaction acceleration unit 11a in the carbonated water producing tower 10. In this manner, carbonated water is produced. Furthermore, because solvent water adheres to the surface of the ballast and glass balls of the reaction accelerator unit 11a, the area in which the solvent water comes into contact with carbon dioxide gas increases. As a result, a large amount of carbon dioxide gas is dissolved in solvent water. The excess exhaust gas that has not been dissolved is exhausted out of the carbonated water producing tower 10 through the gas exhaust opening 15.

The carbonated water generated in this manner flows out through the carbonated water outflow opening 14 and is led to the carbonated water inflow opening 22 of the granulated blast-furnace slag processing vessel 20. Note that the concentrated carbonated water storage vessel 40 is provided between the carbonated water outflow opening 14 and the carbonated water inflow opening 22 to adjust the volume of carbonated water flowing into the storage vessel 21. The storage vessel 21 of the granulated blast-furnace slag processing vessel 20 is filled with the carbonated water flowing through the carbonated water inflow opening 22.

The granulated blast-furnace slag X generated in the blast-furnace facility is transported by the transportation unit D and is introduced into the storage vessel 21 through the slag introduction opening 23. The introduced granulated blast-furnace slag X accumulates on the bottom of the V-shaped base in some degree and is immersed in the carbonated water filling the storage vessel 21. In this manner, calcium ions flowing out of the granulated blast-furnace slag X and calcium hydroxide generated during the water cooling process are rapidly neutralized by carbonate ions included in the carbonated water. As a result, the latent hydraulic property of the slag is suppressed. That is, calcium carbonate generated during this neutralization reaction coats the surfaces of slag particles and of innumerable cavities therein. Therefore, calcium ions are prevented from coming into contact with water and the generation of calcium hydroxide is suppressed. As a result, the latent hydraulic property is suppressed. Since the granulated blast-furnace slag X is directly immersed into carbonated water and comes into contact with acid, carbonated water sufficiently permeates the innumerable cavities in the slag particles. This means that the latent hydraulic property of the slag particles is suppressed evenly as a whole. Furthermore, immediately after being drawn out of the granulation vessel B, the slag particles are immersed into carbonated water. Therefore, this system is very effective at preventing granulated blast-furnace slag from solidifying.

The introduced granulated blast-furnace slag X slides down the inclined surface of the base of the storage vessel 21, goes through the space under the partition wall 25, and accumulates on the bottom of the base. The granulated blast-furnace slag X is then discharged from the storage vessel 21 along the opposite inclined surface by the slag discharge unit 24. On the other hand, the carbonated water generated in the carbonated water producing tower 10 flows through the carbonated water inflow opening 22, goes through the space under the partition wall 25, and is discharged through the slag introduction opening 23. That is, the granulated blast-furnace slag X and the carbonated water move in opposite directions. As a result, the reaction is further accelerated.

After being discharged by the slag discharge unit 24, the weakly acid granulated blast-furnace slag Xa is transported to a temporary slag storage space by a belt conveyor and is accumulated there. The accumulated granulated blast-furnace slag Xa remains weakly acid because of the carbonated water. Excess carbonated water reacts with calcium ions and becomes a solution of calcium hydrogencarbonate salt. The solution stays in the innumerable cavities in slag particles and prevents an external alkaline stimulus. Also, the calcium hydrogencarbonate salt is a stable substance and does not decompose for a long time. Furthermore, on drying, the calcium hydrogencarbonate salt decomposes and becomes calcium carbonate and carbon dioxide gas. The calcium carbonate forms another coat over the calcium salt coat initially formed over the slag. As a result, the solidification is more securely prevented.

The carbonated water diluted by the processing of the granulated blast-furnace slag X in the granulated blast-furnace slag processing vessel 20 is stored in the diluted carbonated water storage vessel 31 of the circulation system 30, is transferred through the first circulation route 32 to the adjustment storage vessel 33, is adjusted by adding supplement water in the adjustment storage vessel 33, is transferred through the second circulation route 34 to the carbonated water producing tower 10, and is reused as solvent water in the carbonated water producing tower 10.

EFFECT OF THE INVENTION

As described above, the present invention achieves the following effects.

Granulated blast-furnace slag is conventionally neutralized by cooling water during its generation process. In the present invention, however, granulated blast-furnace slag is firstly cooled by cooling water and is then immersed in carbonated water. Therefore, carbon dioxide is not aerified and released, and the carbonated water remains in concentrated form. As a result, the concentrated carbonated water effectively reacts with the granulated blast-furnace slag. Also, immediately after being drawn out of the granulation vessel B, slag is immersed into carbonated water. Therefore, the system and method of the present invention are very effective at preventing the solidification. Furthermore, the system and method of the present invention are safe because carbonated water is used. Exhaust gas from a blast-furnace facility which includes a large amount of carbon dioxide is used. Therefore, it is easy to manage the carbon dioxide which is used to produce the carbonated water.

In addition, by immersing granulated blast-furnace slag in carbonated water, the carbonated water permeates the granulated blast-furnace slag evenly, so that the solidification prevention processing is performed immediately. Therefore, granulated blast-furnace slag can be subjected to the solidification prevention process successively, meaning that a large amount of blast-furnace slag can be subjected to the solidification prevention process sequentially and successively. That means the system and method of the present invention are of great practical use.

INDUSTRIAL USE POSSIBILITY

The present invention is a method and a system to make good use of granulated blast-furnace slag, which is generated in large quantity during steelmaking and is generally an industrial waste.

What is claimed is:

1. A solidification prevention method for granulated blast-furnace slag comprising:
    a first step for generating carbonated water by dissolving carbon dioxide gas in water; and,
    a second step for, after granulated blast-furnace slag has been cooled to a point where carbon dioxide is not aerified and released from the carbonated water when it contacts the granulated blast-furnace slag, draining the granulated blast-furnace slag and then immersing the granulated blast-furnace slag in the generated carbonated water.

2. The solidification prevention method of claim 1 where the carbonated water generated in the first step is generated by introducing exhaust gas from an existing blast-furnace facility into a carbonated water generating tower.

3. A solidification prevention system for granulated blast-furnace slag comprising:
    a carbonated water generation means; and,
    a granulated blast-furnace slag processing means;
    wherein the carbonated water generation means includes:
        a reaction unit for generating carbonated water by dissolving carbon dioxide gas in water, said reaction unit located separate from the granulated blast-furnace slag processing means;
        a water inflow opening for allowing the water to flow into the reaction unit;
        a gas inflow opening for allowing the carbon dioxide gas to flow into the reaction unit; and,
        a carbonated water outflow opening for allowing the generated carbonated water to flow out of the reaction unit, and
    the granulated blast-furnace slag processing means includes:
        a storage vessel for storing the generated carbonated water;
        a carbonated water inflow open for allowing the generated carbonated water to flow into the storage vessel;
        a slag introduction unit for introducing granulated blast-furnace slag into the storage vessel; and,
        a slag discharge unit for discharging the granulated blast-furnace slag from the storage vessel.

4. The solidification prevention system of claim 3 characterized by further comprising:
    a first cooling unit for cooling and granulating molten slag;
    a second cooling unit for cooling the granulated blast-furnace slag generated by the first cooling unit; and
    a transport unit for transporting the granulated blast-furnace slag to the slag introduction unit immediately after the granulated blast-furnace slag has been cooled by the second cooling unit.

5. The solidification prevention system of claim 4 characterized by further comprising a water circulation means for circulating carbonated water remaining in the storage vessel for use as the water for generating the carbonated water.

6. A system for granulating molten slag comprising:
    a source of molten slag;
    a cooling unit for cooling the molten slag with water to provide granulated slag;
    a transportation unit for transporting the granulated slag;
    a carbonated water producing unit for dissolving carbon dioxide gas in water to provide carbonated water having a volume ratio of water to carbon dioxide of about 1:7.6 at 25° C. at atmospheric pressure, said carbonated water producing unit including a source of carbon dioxide gas, a source of water and a reaction unit for combining the water and carbon dioxide gas;
    a processing unit operatively connected to the transporting unit and the carbonated water producing unit including a vessel for holding the carbonated water and receiving the granulated slag so that it is immersed in the carbonated water to be neutralized by carbonate ions to provide a treated granulated slag; and,
    a slag discharge unit for removing the treated granulated slag.

7. A method of granulating molten slag comprising the steps of:
    cooling molten slag in a cooling unit with water to provide granulated slag at a temperature point where carbon dioxide is not aerified and released from carbonated water when it contacts the granulated slag;
    transporting the granulated slag from the cooling unit to a processing unit; and,
    immersing the granulated molten slag in carbonated water in the processing unit to neutralize the granulated slag with carbonate ions to suppress a latent hydraulic property.

8. The method of claim 7 further including the step of carbonating water by dissolving carbon dioxide gas in water in a reaction unit wherein a large contact surface area is provided for the water.

9. The method of claim 8 further including the step of providing carbon dioxide from the exhaust gases of a slag blast-furnace that produces the molten slag.

10. A solidification prevention method for granulated blast-furnace slag comprising:
    a first step for generating carbonated water by dissolving carbon dioxide gas in water; and,
    a second step for immersing granulated blast-furnace slag in the generated carbonated water after the granulated blast-furnace slag has been cooled to a temperature point where carbon dioxide is not aerified and released from the generated carbonated water when it contacts the granulated blast-furnace slag.

11. The solidification prevention method of claim 10; characterized in that in the first step, exhaust gas from an existing blast-furnace facility is led into a carbonated water producing tower to produce the carbonated water.

12. A solidification prevention system for granulated blast-furnace slag comprising:
    a carbonated water generation means; and,
    a granulated blast-furnace slag processing means;
    wherein the carbonated water generation means includes:

a reaction unit for generating carbonated water by dissolving carbon dioxide gas in water, said reaction unit located separate from the granulated blast-furnace slag processing means;

a water inflow opening for allowing the water to flow into the reaction unit;

a gas inflow opening for allowing the carbon dioxide gas to flow into the reaction unit; and, a carbonated water outflow opening for allowing the generated carbonated water to flow out of the reaction unit, and the granulated blast-furnace slag processing means includes:

a storage vessel for storing the generated carbonated water;

a carbonated water inflow opening for allowing the generated carbonated water to flow into the storage vessel by gravitation;

a slag introduction unit for introducing granulated blast-furnace slag into the storage vessel; and, a slag discharge unit for discharging the granulated blast-furnace slag from the storage vessel.

13. A solidification prevention method for granulated blast-furnace slag comprising:

a first step for generating carbonated water, having a volume ratio of water to carbon dioxide of about 1:7.6 at 25° C. at atmospheric pressure, by dissolving carbon dioxide gas in water; and, a second step for immersing granulated blast-furnace slag in the generated carbonated water.

14. The method of claim 13 further comprising an intermediate step between the first and second steps of cooling the granulated blast-furnace slag to a temperature point where carbon dioxide is not aerified and released from the generated carbonated water when it contacts the granulated blast-furnace slag.

* * * * *